United States Patent
Mullins et al.

(10) Patent No.: US 10,949,524 B2
(45) Date of Patent: Mar. 16, 2021

(54) USER AUTHENTICATION USING SCENE COMPOSED OF SELECTED OBJECTS

(71) Applicant: RSA Security LLC, Bedford, MA (US)

(72) Inventors: Brian Mullins, Burlington, MA (US);
Salah Machani, Medford, MA (US);
Millie Ng, Bedford, MA (US)

(73) Assignee: RSA Security LLC, Bedford, MA (US)

( * ) Notice: Subject to any disclaimer, the term of this patent is extended or adjusted under 35 U.S.C. 154(b) by 209 days.

(21) Appl. No.: 16/176,083

(22) Filed: Oct. 31, 2018

(65) Prior Publication Data
US 2020/0134158 A1 Apr. 30, 2020

(51) Int. Cl.
*G06F 21/00* (2013.01)
*G06F 21/36* (2013.01)
*G06F 21/34* (2013.01)
*H04L 29/06* (2006.01)

(52) U.S. Cl.
CPC .............. *G06F 21/36* (2013.01); *G06F 21/34* (2013.01); *H04L 63/0884* (2013.01); *H04L 63/102* (2013.01); *G06F 2221/2103* (2013.01); *G06F 2221/2117* (2013.01)

(58) Field of Classification Search
CPC .. G06F 21/36; G06F 21/34; G06F 2221/2117; G06F 2221/2103; H04L 63/0884; H04L 63/102
See application file for complete search history.

(56) References Cited

U.S. PATENT DOCUMENTS

| | | | | |
|---|---|---|---|---|
| 8,732,819 | B2* | 5/2014 | Maetz | G06F 21/36 |
| | | | | 726/18 |
| 9,235,715 | B1* | 1/2016 | Bailey | G06F 21/602 |
| 9,361,447 | B1* | 6/2016 | Bowers | G06F 21/36 |
| 2004/0230843 | A1* | 11/2004 | Jansen | G06F 21/36 |
| | | | | 726/7 |

(Continued)

OTHER PUBLICATIONS

Jansen et al., "Picture Password: A Visual Login Technique for Mobile Devices," National Institute of Standards and Technology, Technology Administration, U.S. Department of Commerce, NISTIR 7030, Jul. 2003.

(Continued)

*Primary Examiner* — Brandon S Hoffman
*Assistant Examiner* — William A Corum, Jr.
(74) *Attorney, Agent, or Firm* — Danielson Legal LLC

(57) ABSTRACT

User authentication techniques are provided using a scene composed of selected objects. An exemplary method comprises obtaining enrollment information from a user, wherein the enrollment information comprises a first scene comprised of a first selection of objects; initiating a challenge to the user in connection with an authentication request by the user to access a protected resource; processing a second scene comprised of a second selection of objects submitted by the user in response to the challenge, and wherein the processing comprises determining a likelihood that the submitted second scene comprised of the second selection of objects matches the first scene comprised of the first selection of objects submitted by the user with the enrollment information; and resolving the authentication request based on the likelihood. Objects in the first selection of objects are optionally selected from a catalog and arranged into the first scene.

19 Claims, 9 Drawing Sheets

(56) References Cited

U.S. PATENT DOCUMENTS

| | | | | |
|---|---|---|---|---|
| 2006/0100938 A1* | 5/2006 | Fukuma | ............... | G02C 13/003 |
| | | | | 382/118 |
| 2007/0277224 A1* | 11/2007 | Osborn | ................. | G06F 21/36 |
| | | | | 726/2 |
| 2009/0038006 A1* | 2/2009 | Traenkenschuh | ....... | G06F 21/36 |
| | | | | 726/21 |
| 2009/0178136 A1* | 7/2009 | Ruddy | ................... | G06F 21/36 |
| | | | | 726/19 |
| 2010/0169958 A1* | 7/2010 | Werner | ................. | G06F 21/36 |
| | | | | 726/6 |
| 2015/0301724 A1* | 10/2015 | Thibadeau, Sr. | ... | G06F 3/04842 |
| | | | | 706/12 |
| 2016/0306994 A1* | 10/2016 | Olsen-Kreusch | ............................ | |
| | | | | G06F 21/6218 |
| 2017/0318019 A1* | 11/2017 | Gordon | ............... | G06K 9/00617 |
| 2019/0236259 A1* | 8/2019 | Remillet | ............. | G06F 3/04815 |
| 2019/0347399 A1* | 11/2019 | Cramer | ................... | G06F 21/46 |
| 2019/0354669 A1* | 11/2019 | Brantley | ................. | G06F 21/45 |

OTHER PUBLICATIONS

Renaud et al. "Visual Passwords: Cure-all or Snake-oil?" Communications of the ACM, Dec. 2009.

* cited by examiner

USER AUTHENTICATION USING SCENE COMPOSED OF SELECTED OBJECTS

FIELD

The field relates generally to information processing systems, and more particularly to authentication techniques in such systems.

BACKGROUND

In order to gain access to applications or other resources via a computer or another user device, users are often required to authenticate themselves by entering authentication information. Such authentication information may comprise, for example, passwords, responses to one or more challenges, or other forms of cryptographic or authentication information. In a conventional challenge-response system, for example, a user must submit an appropriate response that addresses the authentication challenge. The submitted response is compared to authentication information that was previously provided by the user during an enrollment phase, in order to make an authentication decision.

A need exists for improved techniques for authenticating a user.

SUMMARY

In one embodiment, a method comprises obtaining enrollment information from a user, wherein the enrollment information comprises a first scene comprised of a first selection of objects; initiating a challenge to the user in connection with an authentication request by the user to access a protected resource; processing a second scene comprised of a second selection of objects submitted by the user in response to the challenge, and wherein the processing comprises determining a likelihood that the submitted second scene comprised of the second selection of objects matches the first scene comprised of the first selection of objects submitted by the user with the enrollment information; and resolving the authentication request based on the likelihood.

In some embodiments, one or more objects in the first selection of objects are selected from a catalog and arranged into the first scene. At least one object in the first scene optionally has a plurality of states and a particular state of the plurality of states is selected for the at least one object.

In one or more embodiments, an entropy is established to satisfy a predefined policy by varying one or more of: a size of an object catalog; a number of objects selected in the first selection; an ordering of the selected objects in the first selection; a placement of the objects within the first selection; a state of the one or more of the selected objects; and a physical surrounding of the first scene.

Other illustrative embodiments include, without limitation, apparatus, systems, methods and computer program products comprising processor-readable storage media.

DETAILED DESCRIPTION

Illustrative embodiments of the present disclosure will be described herein with reference to exemplary communication, storage and processing devices. It is to be appreciated, however, that the disclosure is not restricted to use with the particular illustrative configurations shown. One or more embodiments of the disclosure provide methods, apparatus and computer program products for authenticating a user using a scene submitted by the user comprised of a selection of objects.

In one or more embodiments, a user selects multiple objects from a catalog to compose a scene that is captured during an enrollment phase and then later used for authentication purposes. In various embodiments, scenes can be captured as an image or as a short video (e.g., with a duration of approximately two seconds).

Generally, by composing the scene using a selection of objects (e.g., virtual objects) during enrollment, a composed scene is captured that may be used for authentication purposes.

In at least one embodiment, the entropy of the disclosed authentication techniques depend on several factors, including, for example, the size of the object catalog; the number of objects selected; the ordering of the selected objects; the placement of the selected objects within the scene; the state of the selected objects; and the physical surroundings in a scene (and, optionally, a face and/or avatar of the user).

In this manner, the number of objects selected and the size of the catalog may be varied, for example, to achieve a desired entropy (for example, as required by a policy of an organization, such as an enterprise). In addition, password rotation techniques can be applied to the selected objects according to a desired password expiration policy.

Figure 1:
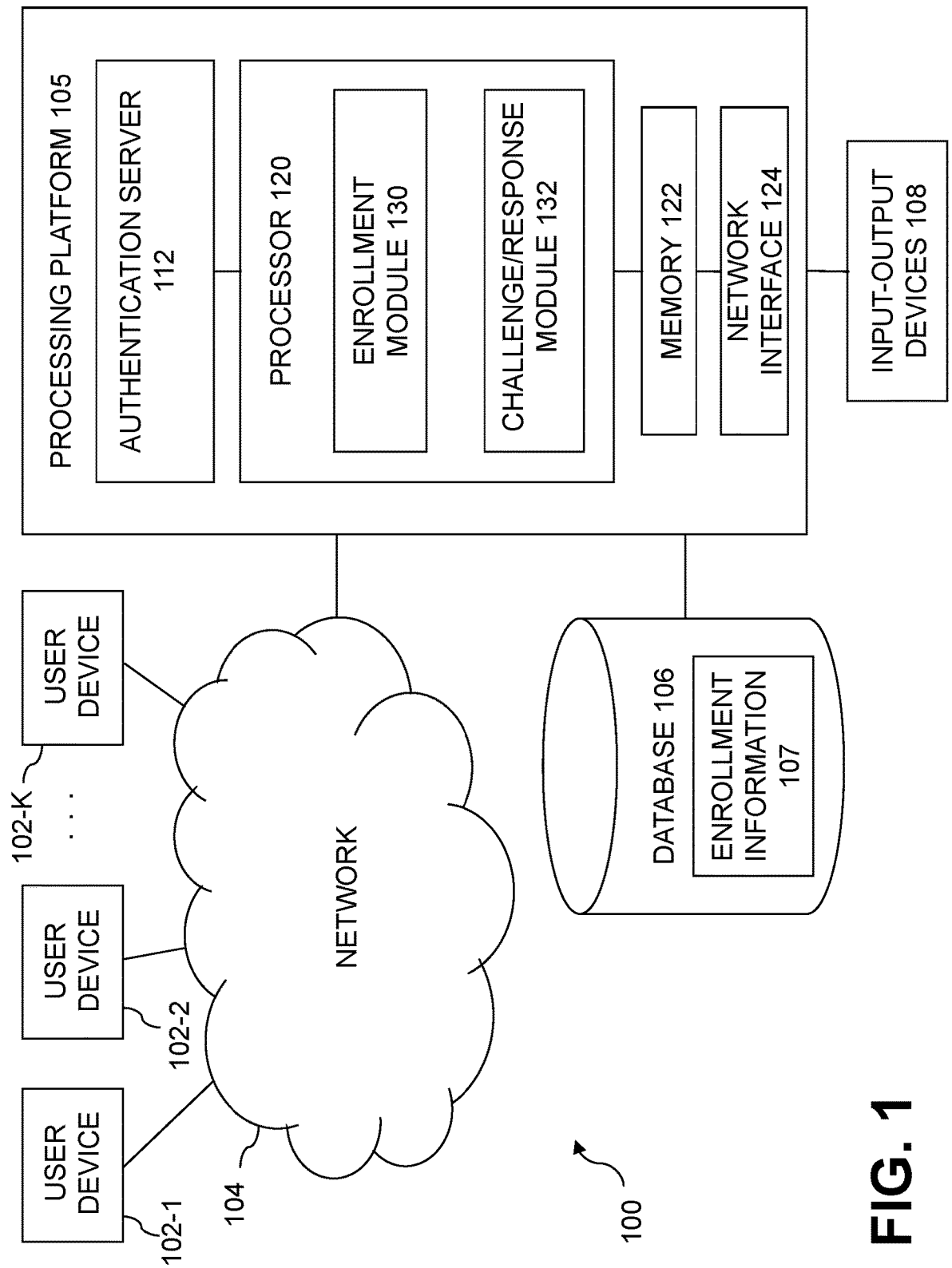
FIG. 1 shows an information processing system configured for performing authentication in one embodiment of the disclosure.

FIG. 1 shows a computer network 100 configured in accordance with an illustrative embodiment of the disclosure. The computer network 100 comprises a plurality of user devices 102-1, 102-2, . . . 102-K, collectively referred to herein as user devices 102. The user devices 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to the network 104 is a processing platform 105.

The user devices 102 may comprise, for example, mobile telephones, laptop computers, tablet computers, desktop computers or other types of computing devices. Such devices are examples of what are more generally referred to herein as "processing devices." Some of these processing devices are also generally referred to herein as "computers."

The user devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

The processing platform 105 has an associated database 106 configured to store enrollment information 107 that includes one or more scenes submitted by a user during enrollment for authentication, where each scene is comprised of a selection of objects, as discussed further below in conjunction with FIG. 5.

The database 106 in the present embodiment is implemented using one or more storage systems associated with the processing platform 105. Such storage systems can comprise any of a variety of different types of storage including, for example, network-attached storage (NAS), storage area networks (SANs), direct-attached storage (DAS) and distributed DAS, as well as combinations of these and other storage types, including software-defined storage.

Also associated with processing platform 105 are input-output devices 108, which illustratively comprise keyboards, displays or other types of input-output devices in any combination. Such input-output devices are used to support one or more user interfaces to the processing platform 105, as well as to support communication between the processing platform 105 and other related systems and devices not explicitly shown.

Figure 2:
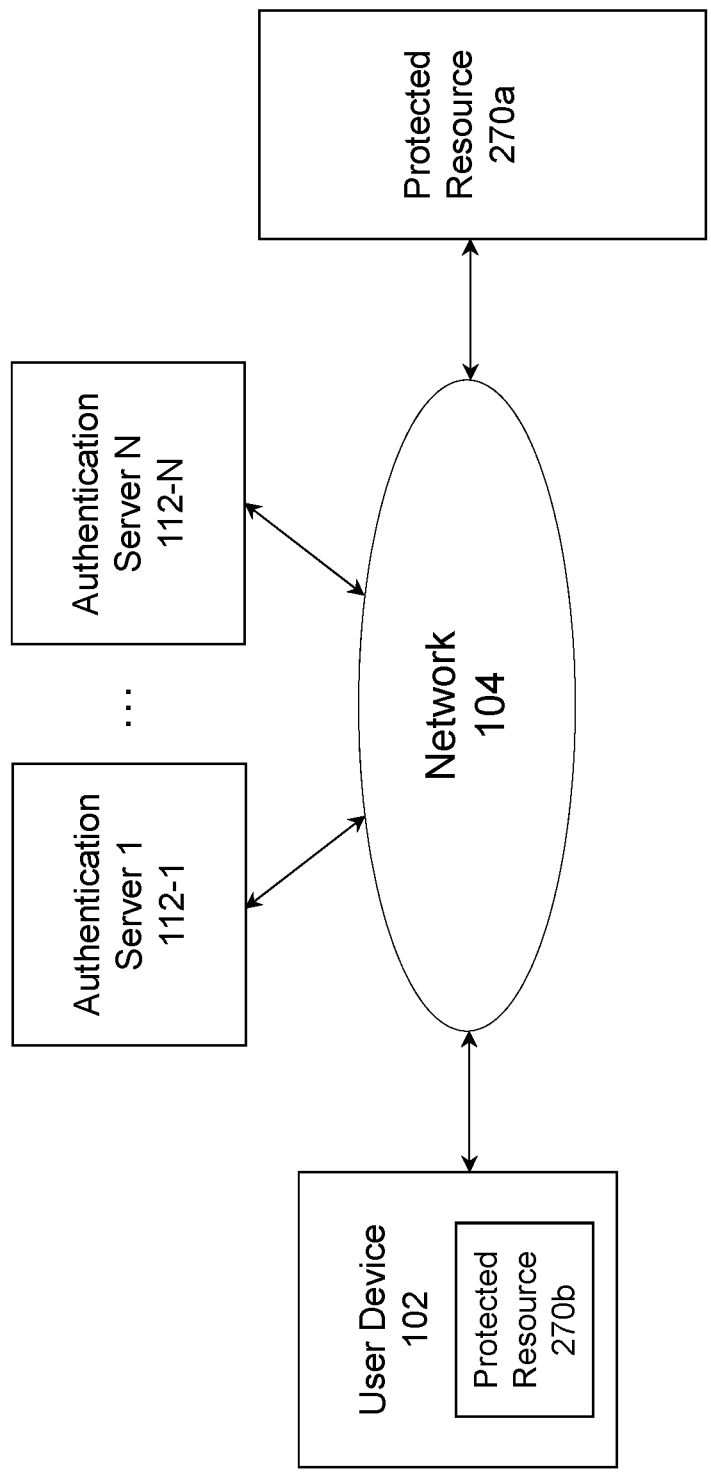
FIG. 2 shows another information processing system configured for performing authentication in at least one embodiment of the disclosure.

In one or more embodiments of the disclosure (such as the example embodiment depicted in FIG. 1), the processing platform 105 comprises an authentication server 112. Authentication events, such as an evaluation of a scene comprised of selected objects submitted by a user, initiated at respective ones of the user devices 102, are directed to the authentication server 112 over the network 104 for processing. The authentication server 112 can determine if a given access attempt is authentic, based on the determined likelihood of plausibility or matching of the composed scene from the user submitted in response to a challenge with the initial composed scene from the user submitted during enrollment. Upon verification of the presented authentication factors, the authentication server 112 grants the requesting user device 102 access to one or more protected resources of the computer network 100 (such as further depicted in FIG. 2, for example). Although shown as an element of the processing platform 105 in this embodiment, the authentication server 112 in other embodiments (such as depicted in FIG. 2, for example) can be implemented at least in part externally to the processing platform 105, for example, as a stand-alone server, set of servers or other type of authentication system coupled to the network 104.

The processing platform 105 in the FIG. 1 embodiment is assumed to be implemented using at least one processing device. Each such processing device generally comprises at least one processor and an associated memory, and implements one or more functional modules for controlling certain features of the processing platform 105.

More particularly, the processing platform 105 in this embodiment comprises a processor 120 coupled to a memory 122 and a network interface 124.

The processor 120 illustratively comprises a microprocessor, a microcontroller, an application-specific integrated circuit (ASIC), a field-programmable gate array (FPGA) or other type of processing circuitry, as well as portions or combinations of such circuitry elements.

The memory 122 illustratively comprises random access memory (RAM), read-only memory (ROM) or other types of memory, in any combination. The memory 122 and other memories disclosed herein may be viewed as examples of what are more generally referred to as "processor-readable storage media" storing executable computer program code or other types of software programs.

One or more embodiments of the disclosure include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals.

The network interface 124 allows the processing platform 105 to communicate over the network 104 with the user devices 102, and illustratively comprises one or more conventional transceivers.

The processor 120 further comprises an enrollment module 130 and a challenge/response module 132.

It is to be appreciated that this particular arrangement of modules 130 and 132 illustrated in the processor 120 of the FIG. 1 embodiment is presented by way of example only, and alternative arrangements can be used in other embodiments. For example, the functionality associated with the modules 130 and 132 in other embodiments can be distributed across multiple processing nodes, or separated across a larger number of modules within processor 120. As another example, multiple distinct processors can be used to implement different ones of the modules 130 and 132 or portions thereof.

At least portions of the enrollment module 130 and/or challenge/response module 132 may be implemented at least in part in the form of software that is stored in memory 122 and executed by processor 120. Similarly, at least portions of the authentication server 112 of the processing platform 105 can be implemented at least in part in the form of software that is stored in memory 122 and executed by processor 120.

It is to be understood that the particular set of elements shown in FIG. 1 for user authentication in authentication processes involving user devices 102 of computer network 100 is presented by way of illustrative example only, and in other embodiments additional or alternative elements may be used. Thus, another embodiment may include additional or alternative systems, devices and other network entities, as well as different arrangements of modules and other components.

By way of example, in other embodiments, the processing platform 105 can be eliminated and associated elements such as authentication server 112, enrollment module 130 and/or challenge/response module 132 can be implemented elsewhere in the computer network 100.

An exemplary process utilizing enrollment module 130 of the processing platform 105 in computer network 100 will be described in more detail with reference to the flow diagram of FIG. 5. An exemplary process utilizing challenge/response module 132 of the processing platform 105 in computer network 100 will be described in more detail with reference to the flow diagram of FIG. 6.

FIG. 2 is a system diagram of an illustrative embodiment of the disclosure. By way of illustration, FIG. 2 depicts an alternative embodiment to FIG. 1, wherein the authentication server(s) 112 is/are not resident on the processing platform 105 or user device(s) 102, but rather are separate devices. Accordingly, as depicted in FIG. 2, user device 102 communicates with a protected resource 270a over network 104. As detailed further below, at least one embodiment of the disclosure can also include a user device 102 that includes a protected resource 270b residing thereon. In an example implementation, a user authenticates online with one or more authentication servers 112-1 through 112-N (hereinafter, collectively referred to as authentication servers 112) before obtaining access to protected resource 270a and/or 270b (hereinafter, collectively referred to as protected resource 270 unless otherwise specified).

According to one aspect of the disclosure, as noted above, the user of the user device 102 is authenticated by authentication servers 112 using a scene composed of selected objects, and/or other forms of cryptographic information. The exemplary communications among the system elements 102, 104 and 270 of FIG. 2 employed to achieve authentication by the authentication servers 112 are discussed further below.

It is to be appreciated that a given embodiment of the disclosed system may include multiple instances of user device 102 and protected resource 270, and possibly other system components, although only single instances of such components are shown in the simplified system diagram of FIG. 2 for clarity of illustration.

As noted herein, user device 102 may represent a portable device, such as a mobile telephone, personal digital assistant (PDA), wireless email device, game console, etc. The user device 102 may alternatively represent a desktop or laptop personal computer (PC), a microcomputer, a workstation, a mainframe computer, a wired telephone, a television set top box, or any other information processing device which can benefit from the use of authentication techniques in accordance with the disclosure.

The user device 102 may also be referred to herein as simply a "user." The term "user," as used in this context, should be understood to encompass, by way of example and without limitation, a user device, a person utilizing or otherwise associated with the device, or a combination of both. An operation described herein as being performed by a user may therefore, for example, be performed by a user device, a person utilizing or otherwise associated with the device, or by a combination of both the person and the device. Similarly, a password, biometric sample, one-time password (OTP), or other cryptographic information described as being associated with a user may, for example, be associated with a user device 102, a person utilizing or otherwise associated with the device, or a combination of both the person and the device.

As also depicted in FIG. 2, the authentication servers 112 can be associated with a third party entity, such as an authentication authority, that processes authentication requests on behalf of web servers and other resources, as well as verifies the cryptographic information that is presented by a user device 102.

Further, the protected resource 270 may be, for example, an access-controlled application, data store, web site or hardware device. In other words, a protected resource 270 is a resource that grants user access responsive to an authentication process, as will be described in greater detail below. For example, protected resource 270a may include an access-controlled file, an e-mail, a protected application, a remote application server such as a web site or other software program or hardware device that is accessed by the user device 102 over a network 104.

Additionally, in at least one embodiment of the disclosure, protected resource 270b can include one or more applications or data residing on the user device 102 itself. For example, such a protected resource 270b can include access to a mobile data management container for launching applications on the user device 102 (such as a mobile device), which can be protected requiring authentication in order to run the application(s) protected by the container. Further, protected resource 270b could also include an access-controlled file, e-mail, protected application, remote application server such as a web site or other software program or hardware device that is accessed by the user device 102 over network 104. Similarly, it is possible that in order to unlock the mobile platform to perform operations, a successful authentication might be required.

Figure 3:
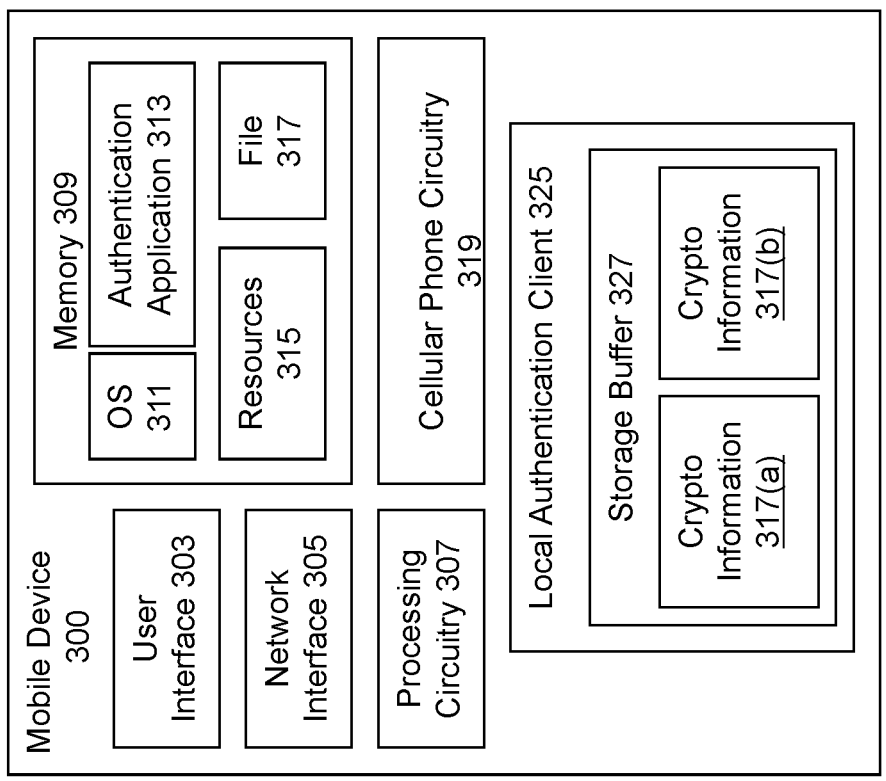
FIG. 3 is a system diagram of an exemplary mobile device on which at least one embodiment of the disclosure can be implemented.

FIG. 3 is a system diagram of an exemplary mobile device 300 on which at least one embodiment of the disclosure can be implemented. By way of illustration, as shown in FIG. 3, the exemplary mobile device 300 comprises a user interface 303 configured to receive user input and provide user output, such as a data file and/or data file location selection(s), such as described herein. One or more embodiments of the disclosure can include components such as a display screen, a capacitive touch display, and a push-button keyboard implemented for use in connection with the user interface 303.

Additionally, the mobile device 300 includes a network interface 305 configured to connect the mobile device 300 to a communications medium such as, for example, Wi-Fi and/or cellular telephony. Accordingly, the network interface 305 enables the mobile device 300 to communicate with the other components of an electronic environment.

The mobile device 300 further comprises a memory 309 configured to store one or more software constructs including, for example, an operating system 311, an authentication application 313, data for protected resources 315 (e.g., documents and restricted applications), a cryptographic information file 317, as well as other suitable or relevant material.

In one or more embodiments, processing circuitry 307 of the mobile device 300 is configured to operate in accordance with the software constructs stored in the memory 309. By way of example, when the processing circuitry 307 runs the operating system 311, the processing circuitry 307 provides a secure electronic platform on which a user is able to carry out work. Such an electronic platform is capable of operating, for example, as a container to protect data requiring user authentication before permitting access. Further, when the processing circuitry 307 runs the authentication application 313, the processing circuitry 307 communicates with a local authentication client 325 in a secure manner, for example, to obtain cryptographic information 317(a), 317(b) from a storage buffer 327, as additionally described herein.

Additionally, for completeness, cellular phone circuitry 319 within mobile device 300 allows the user to establish cellular phone calls with other callers having remote devices, as would be appreciated by one skilled in the art.

It should be appreciated that the processing circuitry 307 can include one or more processors running specialized software components, such as detailed in connection with the techniques detailed herein and further depicted in FIG. 4.

In at least one embodiment of the disclosure, once the mobile device 300 is able to obtain valid cryptographic information, the user of the mobile device 300 is able to perform local user authentication to access protected resources. Accordingly, as noted, the mobile device 300 is provisioned with the authentication application 313 and cryptographic information file 317 holding cryptographic information to be used in connection with an authentication process. For example, and as further detailed herein, such cryptographic information within cryptographic information file 317 can include one or more scenes comprised of objects selected by the user in some embodiments.

Consequently, the processing circuitry 307 of the mobile device 300 can perform a local authentication operation using cryptographic information file 317 stored in the memory 309. In at least one embodiment of the disclosure the processing circuitry 307 runs the authentication application 313, which directs the user of the mobile device 300, via the user interface 303, to enter cryptographic information (such as, for example, the objects selected by the user to compose the scene) which is captured as one or more input elements 317(a), 317(b), etc. While the captured cryptographic information 317(a), 317(b), etc. is temporarily stored in the storage buffer 327 of the local authentication client 325, the authentication application 313 compares the captured user-provided cryptographic information 317(a), 317(b), etc. with the original scene provided by the user during enrollment in file 317 to determine a likelihood of a match and/or plausibility of the user-provided selection of objects in the composed scene.

If a match or otherwise positive resolution is determined via this comparison, the authentication application 313 permits the user to access a protected resource (such as, for example, data in association with element 315 that are stored in the memory 309).

Figure 4:
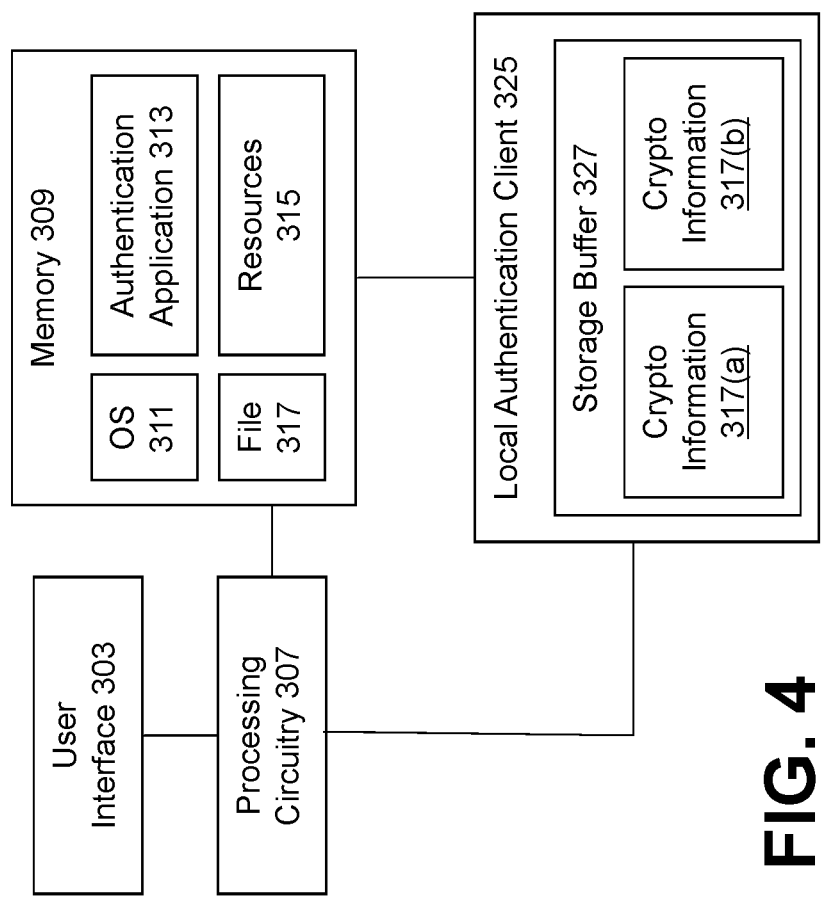
FIG. 4 is a system diagram of exemplary mobile device components, in accordance with one embodiment of the disclosure.

FIG. 4 is a system diagram of exemplary mobile device components, in accordance with at least one embodiment of the disclosure. As depicted in FIG. 4, a user can enter cryptographic information via user interface 303. This entered cryptographic information is captured as one or more input elements 317(a), 317(b). Such input elements can include, as noted above, the user-provided selection of objects to compose a scene.

Accordingly, the captured one or more input elements 317(a), 317(b), etc. can be stored in cryptographic information file 317 to be subsequently used in conjunction with fuzzy logic to carry out an authentication process.

Consequently, a corresponding cryptographic flow (carried out, for example, by authentication application 313 as run by operating system 311) can take the following exemplary form. The user is prompted (via user interface 303) as part of a challenge to enter cryptographic information (such as the objects selected by the user to compose a scene) in connection with an authentication request to access a protected resource associated with the mobile device (for example, the user wishes to access and/or unlock his or her smart phone). The entered cryptographic information is captured by the processing circuitry 307 as one or more input elements 317(a), 317(b) that are temporarily stored in the storage buffer 327 of the local authentication client 325.

Subsequently, the authentication application 313 compares the captured user-provided cryptographic information 317(a), 317(b), etc. with the original scene submitted during an enrollment phase and stored, for example, in memory 309 to determine a likelihood of a match and/or plausibility of the user-provided response(s). If the user-entered input elements 317(a), 317(b) are deemed to be matching and/or plausible, authentication is deemed successful and the user is granted access to the protected resource in question.

As noted above, in one or more embodiments, a user is authenticated using a scene composed of multiple objects selected by the user during enrollment. In response to a challenge, a user submits a new scene composed of multiple objects selected by the user. An authentication decision is made by determining a likelihood that the new scene composed of multiple objects and the submitted response to a challenge matches the original scene composed of multiple objects selected by the user during enrollment.

Figure 5:
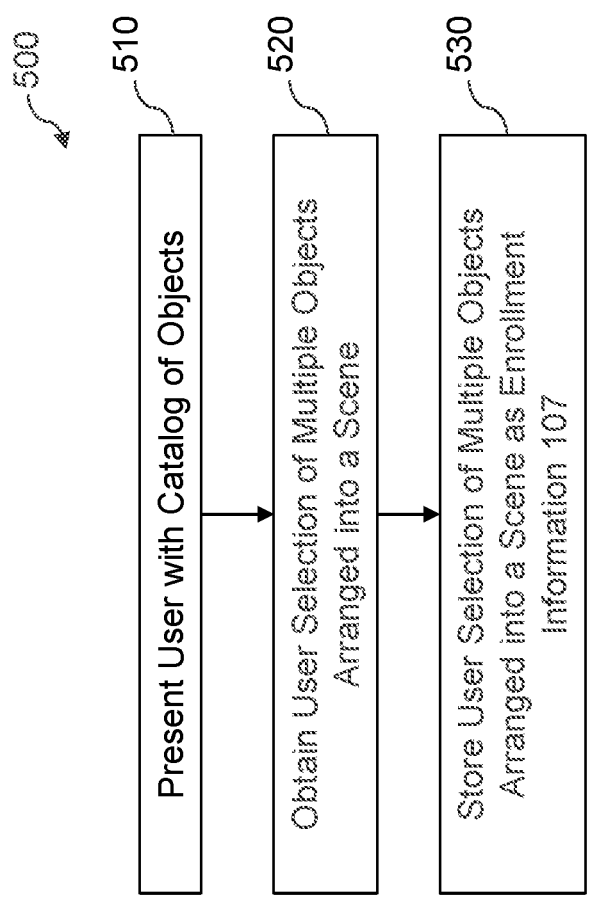
FIG. 5 is a flow diagram of an enrollment process for use in authentication processes in one illustrative embodiment.

FIG. 5 is a flow diagram of an exemplary enrollment process 500 for use in authentication processes in one illustrative embodiment. As shown in FIG. 5, the exemplary enrollment process 500 initially presents the user with a catalog of objects during step 510. The presented catalog of objects may comprise virtual objects and/or real objects.

During step 520, the exemplary enrollment process 500 obtains a user selection of multiple objects from the catalog arranged into a scene, as discussed further below in conjunction with FIG. 7.

Finally, during step 530, the exemplary enrollment process 500 stores the user selection of multiple objects arranged into the scene as enrollment information 107.

Figure 6:
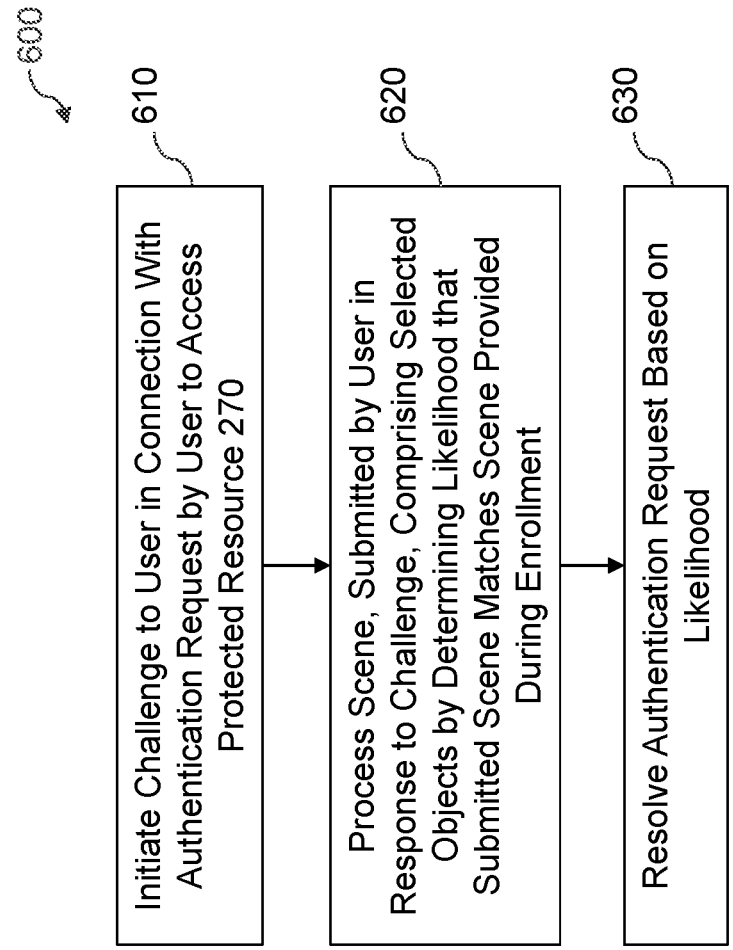
FIG. 6 is a flow diagram of an authentication process for evaluating a scene submitted by a user comprised of a selection of objects, according to one illustrative embodiment of the disclosure.

FIG. 6 is a flow diagram of an exemplary authentication process 600 for evaluating selected objects positioned in a scene, according to one illustrative embodiment of the disclosure. As shown in FIG. 6, the exemplary authentication process 600 initially initiates a challenge to the user in connection with an authentication request by the user to access a protected resource 270 during step 610.

Thereafter, during step 620, the exemplary authentication process 600 processes a scene, submitted by a user in response to the challenge, comprised of multiple selected objects by determining a likelihood that the scene submitted in response to the challenge matches the scene submitted by the user during the enrollment phase. In some embodiments, the user provides the scene for evaluation using a virtual reality input device. In this manner, the constructed scene could be completely virtual or a mixed reality, whereby virtual objects overlay and/or interact with physical objects.

Finally, the exemplary authentication process 600 resolves the authentication request during step 630 based on the likelihood that the scene submitted in response to the challenge matches the scene submitted by the user during the enrollment phase.

In the context of the exemplary authentication process 600, the initiating step performed during step 610 generates the challenge, and the processing step 620 verifies the response. The initiating step 610 and the processing step 620 can be performed by the same device (e.g., authentication server 112 of FIG. 1), in some embodiments, or by a plurality of distributed devices (e.g., authentication servers 112-1 through 112-N of FIG. 2), as would be apparent to a person of ordinary skill in the art Accordingly, the particular processing operations and other network functionality described in conjunction with the flow diagrams of FIGS. 5 and 6 are presented by way of illustrative example only, and should not be construed as limiting the scope of the disclosure in any way. Alternative embodiments can use other types of processing operations to compare a scene submitted by a user in response to a challenge with a scene previously submitted by the user during an enrollment phase in order to make an authentication decision. For example, the ordering of the process steps may be varied in other embodiments, or certain steps may be performed concurrently with one another rather than serially.

Figure 7:
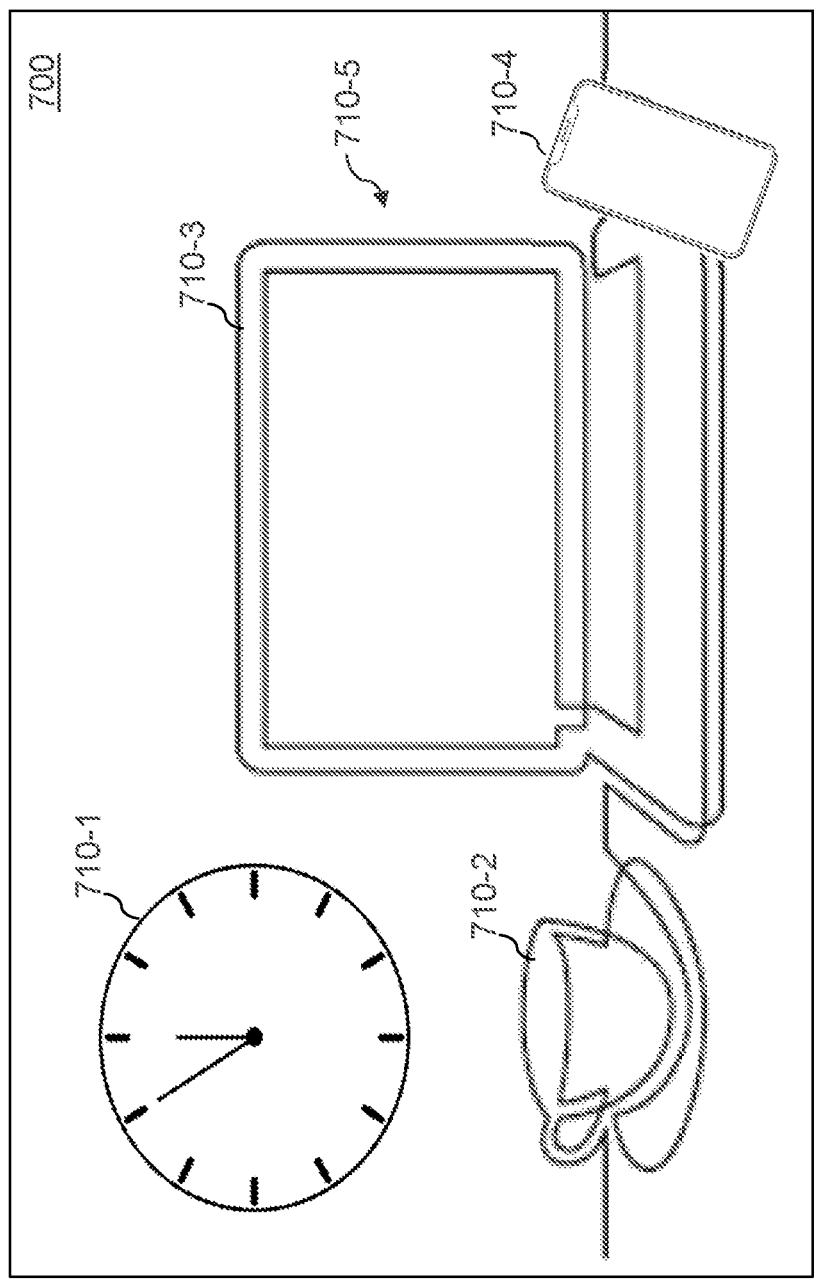
FIG. 7 illustrates an exemplary scene submitted by a user for authentication, according to one embodiment of the disclosure.

FIG. 7 illustrates an exemplary scene 700 submitted by a user for authentication, according to one embodiment of the disclosure. As shown in FIG. 7, the submitted scene 700 comprises a selection of objects 710-1 through 710-5 positioned in the scene 700. In the example of FIG. 7, the selection comprises a clock 710-1, a coffee cup 710-2, a laptop computer 710-3, a cell phone 710-4 and a hidden (or otherwise non-visible) object 710-5 positioned behind the laptop computer 710-3.

The clock 710-1 is an example of a stateful object having multiple states, where a particular state is selected by the user for the clock 710-1 during enrollment. For example, the user can position the clock 710-1 into the scene 700 at a particular location and with a specified time during enrollment, and the clock 710-1 must be positioned into the scene 700 during the authentication phase in the same location in the scene 700 and with the same specified time. In a further example, rather than specifying a specific time, the state may require the user to specify a direction of rotation of the clock 710-1 (e.g., a clockwise rotation).

In the example of FIG. 7, the user can select a hidden (or otherwise non-visible) object, such as hidden object 710-5 positioned behind the laptop computer 710-3, and hide the selected object behind another object in the foreground (physical or virtual), such as laptop 710-3. Among other benefits, the hidden object helps to mitigate over-the-shoulder attacks.

In further variations, the user can arrange an avatar of the user and/or a biometric sample of the user, such as a photograph of the face (or another body part) of the user, into the scene 700. In another variation, the scene 700 optionally comprises an image of an actual environment of the user and the user arranges the selection of objects 710 into the scene 700 of the environment of the user. The user optionally selects the objects 710 from a location dependent catalog. In this case, the virtual object catalog uses information about the location of the user to present a short list of virtual objects in order to expedite the act of authentication.

In the example of FIG. 7, a user initiates a request to access a protected resource 270. The protected resource 270 then requests, for example, a composed scene 700 from the user. The user then selects one or more virtual or real objects 710 and places the selected objects 710 to compose the scene 700 (optionally, setting the state of any stateful objects 710). The authentication service compares the submitted scene comprising the selected objects 710 to a previously registered scene 700. If the scene submitted for authentication matches the registered scene, then the user is authenticated and allowed to access the protected resource 270.

Among other benefits, the disclosed techniques for authenticating a user using a scene comprised of selected objects allow an expiration policy to be applied to an authentication of the user. In this scenario, the user had previously registered their scene 700, with the selected objects. Assume that a company administrator has enabled a policy that all selected objects must be rotated or repositioned, for example, every 90 days. The objects selected by the user expire after the specified expiration period. The user must authenticate using the current (expiring) scene, and then select a new scene with a new set of selected objects to authenticate with in the future. Note that objects may have a fixed expiration period (e.g., 90 days) or a dynamic expiration period based upon other attributes such as a popularity of the objects across users, or a prominence of the objects within the captured scene 700. To represent the aging of an object visually, with respect to the expiration, the object could gradually become more transparent over time as an indication to the user that the user will need to register a new authentication scene when the object is no longer visible.

In some embodiments, the disclosed techniques for authenticating a user using a scene comprised of a selection of objects exhibit a smaller cognitive load, relative to password-based techniques which often require memory of long, complex passwords.

One or more embodiments of the disclosure provide improved methods, apparatus and computer program products for user authentication using registered scenes comprised of multiple selected objects. The foregoing applications and associated embodiments should be considered as illustrative only, and numerous other embodiments can be configured using the techniques disclosed herein, in a wide variety of different applications.

In some embodiments, the disclosed scene-based authentication techniques allow users to authenticate while remaining immersed in an alternate reality, for example, as may be the case with users exploring a virtual or augmented reality.

It should also be understood that the disclosed scene-based authentication techniques, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for user authentication using registered scenes comprised of multiple selected objects may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute services can be offered to cloud infrastructure tenants or other system users as a Platform as a Service (PaaS) offering, although numerous alternative arrangements are possible.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as a cloud-based authentication engine, or portions thereof, are illustratively implemented for use by tenants of such a multi-tenant environment.

Cloud infrastructure as disclosed herein can include cloud-based systems such as Amazon Web Services (AWS), Google Cloud Platform (GCP) and Microsoft Azure. Virtual machines provided in such systems can be used to implement at least portions of a cloud-based authentication platform in illustrative embodiments. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 8 and 9. These platforms may also be used to implement at least portions of other information processing systems in other embodiments.

Figure 8:
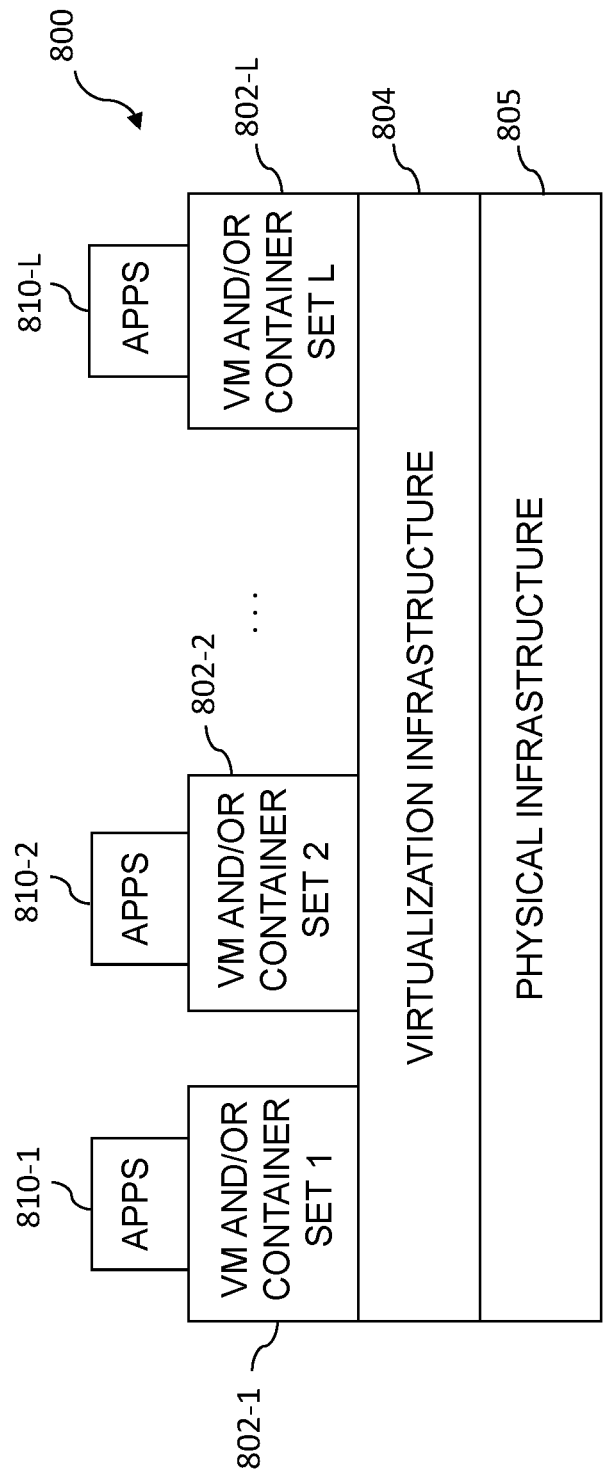
FIG. 8 illustrates an exemplary processing platform that may be used to implement at least a portion of one or more embodiments of the disclosure comprising a cloud infrastructure.

FIG. 8 shows an example processing platform comprising cloud infrastructure 800. The cloud infrastructure 800 comprises a combination of physical and virtual processing resources that may be utilized to implement at least a portion of the disclosed authentication system. The cloud infrastructure 800 comprises multiple virtual machines (VMs) and/or container sets 802-1, 802-2, . . . 802-L implemented using virtualization infrastructure 804. The virtualization infrastructure 804 runs on physical infrastructure 805, and illustratively comprises one or more hypervisors and/or operating system level virtualization infrastructure. The operating system level virtualization infrastructure illustratively comprises kernel control groups of a Linux operating system or other type of operating system.

The cloud infrastructure 800 further comprises sets of applications 810-1, 810-2, . . . 810-L running on respective ones of the VMs/container sets 802-1, 802-2, . . . 802-L under the control of the virtualization infrastructure 804. The VMs/container sets 802 may comprise respective VMs, respective sets of one or more containers, or respective sets of one or more containers running in VMs.

In some implementations of the FIG. 8 embodiment, the VMs/container sets 802 comprise respective VMs implemented using virtualization infrastructure 804 that comprises at least one hypervisor. Such implementations can provide scene-based authentication functionality of the type described above for one or more processes running on a given one of the VMs. For example, each of the VMs can implement scene-based authentication control logic and associated scene enrollment techniques for providing scene-based authentication functionality for one or more processes running on that particular VM.

An example of a hypervisor platform that may be used to implement a hypervisor within the virtualization infrastructure 804 is the VMware® vSphere® which may have an associated virtual infrastructure management system such as the VMware® vCenter™. The underlying physical machines may comprise one or more distributed processing platforms that include one or more storage systems.

In other implementations of the FIG. 8 embodiment, the VMs/container sets 802 comprise respective containers implemented using virtualization infrastructure 804 that provides operating system level virtualization functionality, such as support for Docker containers running on bare metal hosts, or Docker containers running on VMs. The containers are illustratively implemented using respective kernel control groups of the operating system. Such implementations can provide scene-based authentication functionality of the type described above for one or more processes running on different ones of the containers. For example, a container host device supporting multiple containers of one or more container sets can implement one or more instances of scene-based authentication control logic and associated scene enrollment features for use in registering scenes comprised of multiple selected objects.

As is apparent from the above, one or more of the processing modules or other components of the authentication server 112 may each run on a computer, server, storage device or other processing platform element. A given such element may be viewed as an example of what is more generally referred to herein as a "processing device." The cloud infrastructure 800 shown in FIG. 8 may represent at least a portion of one processing platform. Another example of such a processing platform is processing platform 900 shown in FIG. 9.

The processing platform 900 in this embodiment comprises at least a portion of the given system and includes a plurality of processing devices, denoted 902-1, 902-2, 902-3, . . . 902-K, which communicate with one another over a network 904. The network 904 may comprise any type of network, such as a wireless area network (WAN), a local area network (LAN), a satellite network, a telephone or cable network, a cellular network, a wireless network such as WiFi or WiMAX, or various portions or combinations of these and other types of networks.

The processing device 902-1 in the processing platform 900 comprises a processor 910 coupled to a memory 912. The processor 910 may comprise a microprocessor, a microcontroller, an application specific integrated circuit (ASIC), a field programmable gate array (FPGA) or other type of processing circuitry, as well as portions or combinations of such circuitry elements, and the memory 912, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 902-1 is network interface circuitry 914, which is used to interface the processing device with the network 904 and other system components, and may comprise conventional transceivers.

The other processing devices 902 of the processing platform 900 are assumed to be configured in a manner similar to that shown for processing device 902-1 in the figure.

Again, the particular processing platform 900 shown in the figure is presented by way of example only, and the given system may include additional or alternative processing platforms, as well as numerous distinct processing platforms in any combination, with each such platform comprising one or more computers, storage devices or other processing devices.

Figure 9:
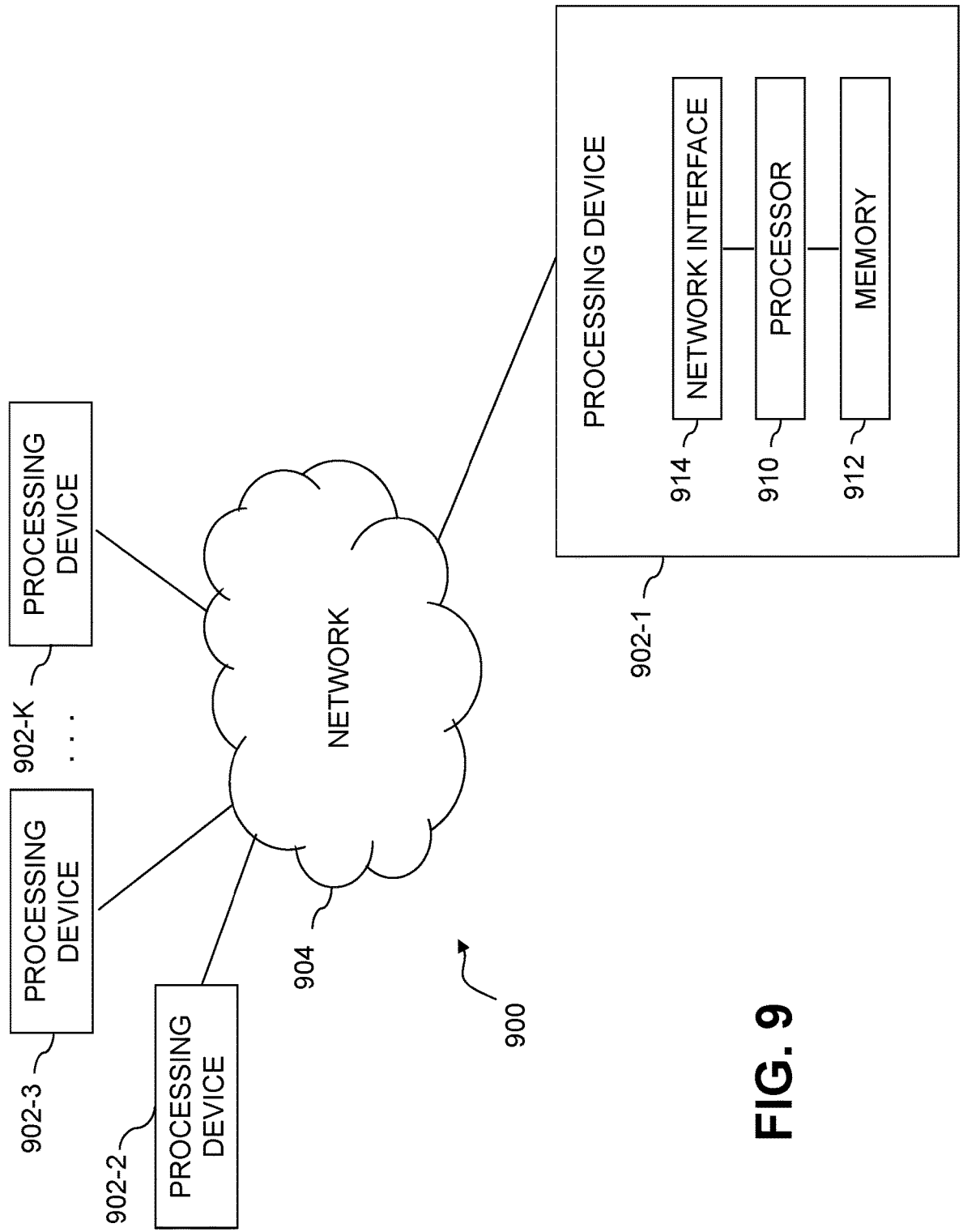
FIG. 9 illustrates another exemplary processing platform that may be used to implement at least a portion of one or more embodiments of the disclosure.

Multiple elements of an information processing system may be collectively implemented on a common processing platform of the type shown in FIG. 8 or 9, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in one or more of the figures are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method of authenticating a user, the method comprising:
    obtaining enrollment information from a user, wherein the enrollment information comprises a first scene comprised of a first selection of objects;
    initiating a challenge to the user in connection with an authentication request by the user to access a protected resource;
    processing, using at least one processing device, a second scene comprised of a second selection of objects submitted by the user in response to the challenge, and wherein the processing comprises determining a likelihood that the submitted second scene comprised of the second selection of objects matches the first scene comprised of the first selection of objects submitted by the user with the enrollment information; and
    resolving, using the at least one processing device, the authentication request based on the determined likelihood, wherein at least one object of the second selection of objects becomes more transparent over time in accordance with an expiration period to indicate that the user will need to register a new first scene when the at least one object of the second selection of objects is no longer visible.

2. The method of claim 1, wherein the user provides the second scene using a virtual reality input device.

3. The method of claim 1, wherein the first selection of objects comprises one or more objects selected from a catalog and arranged into the first scene.

4. The method of claim 1, wherein the enrollment information expires after an amount of time according to an expiration policy.

5. The method of claim 1, wherein the first selection of objects comprises an avatar of the user arranged into the first scene.

6. The method of claim 1, wherein the first selection of objects comprises at least one object having a plurality of states and wherein a particular state of the plurality of states is selected for the at least one object.

7. The method of claim 1, wherein the first selection of objects includes a first object that is positioned behind a second object such that the first object is not visible.

8. The method of claim 1, wherein
    the expiration period varies based on at least one of the popularity with a plurality of a users of an object from the first selection of objects or the prominence of the first selection of objects within the first scene.

9. The method of claim 1, wherein an entropy is established to satisfy a predefined policy by varying one or more of: a size of an object catalog; a number of objects selected in the first selection; an ordering of the selected objects in the first selection; a placement of the objects within the first selection; a state of the one or more of the selected objects; and a physical surrounding of the first scene.

10. A system for authenticating a user, the system comprising:
a memory; and
at least one processing device, coupled to the memory, operative to implement the following steps:
obtaining enrollment information from a user, wherein the enrollment information comprises a first scene comprised of a first selection of objects that includes a first object that is positioned behind a second object;
initiating a challenge to the user in connection with an authentication request by the user to access a protected resource;
processing a second scene comprised of a second selection of objects submitted by the user in response to the challenge, and wherein the processing comprises determining a likelihood that the submitted second scene comprised of the second selection of objects matches the first scene comprised of the first selection of objects submitted by the user with the enrollment information; and
resolving the authentication request based on the determined likelihood, wherein at least one object of the second selection of objects becomes more transparent over time in accordance with an expiration period to indicate that the user will need to register a new first scene when the at least one object of the second selection of objects is no longer visible.

11. The system of claim 10, wherein the first selection of objects comprises one or more objects selected from a catalog and arranged into the first scene.

12. The system of claim 10, wherein at least one object in the first scene has a plurality of states and wherein a particular state of the plurality of states is selected for the at least one object.

13. The system of claim 10, wherein the first scene comprises an image of an environment of the user and wherein the first selection of objects is arranged into the first scene of the environment of the user and wherein the first selection of objects comprises one or more objects selected from a location dependent catalog.

14. The system of claim 10, wherein an entropy is established to satisfy a predefined policy by varying one or more of: a size of an object catalog; a number of objects selected in the first selection; an ordering of the selected objects in the first selection; a placement of the objects within the first selection; a state of the one or more of the selected objects; and a physical surrounding of the first scene.

15. A computer program product for authenticating a user, comprising a tangible machine-readable storage medium having encoded therein executable code of one or more software programs, wherein the one or more software programs when executed by at least one processing device perform the following steps:
obtaining enrollment information from a user, wherein the enrollment information comprises a first scene comprised of a first selection of objects that includes a first object that is positioned behind a second object;
initiating a challenge to the user in connection with an authentication request by the user to access a protected resource;
processing a second scene comprised of a second selection of objects submitted by the user in response to the challenge, and wherein the processing comprises determining a likelihood that the submitted second scene comprised of the second selection of objects matches the first scene comprised of the first selection of objects submitted by the user with the enrollment information; and
resolving the authentication request based on the likelihood, wherein at least one object of the second selection of objects becomes more transparent over time in accordance with an expiration period to indicate that the user will need to register a new first scene when the at least one object of the second selection of objects is no longer visible.

16. The computer program product of claim 15, wherein the first selection of objects comprises one or more objects selected from a catalog and arranged into the first scene.

17. The computer program product of claim 15, wherein at least one object in the first scene has a plurality of states and wherein a particular state of the plurality of states is selected for the at least one object.

18. The computer program product of claim 15, wherein the first scene comprises an image of an environment of the user and wherein the first selection of objects is arranged into the first scene of the environment of the user and wherein the first selection of objects comprises one or more objects selected from a location dependent catalog.

19. The computer program product of claim 15, wherein an entropy is established to satisfy a predefined policy by varying one or more of: a size of an object catalog; a number of objects selected in the first selection; an ordering of the selected objects in the first selection; a placement of the objects within the first selection; a state of the one or more of the selected objects; and a physical surrounding of the first scene.

* * * * *